(12) United States Patent
Lee et al.

(10) Patent No.: US 11,670,783 B2
(45) Date of Patent: Jun. 6, 2023

(54) FUEL CELL VEHICLE

(71) Applicants: HYUNDAI MOTOR COMPANY, Seoul (KR); KIA MOTORS CORPORATION, Seoul (KR)

(72) Inventors: Ju Hyeop Lee, Yongin-si (KR); Chang Yeol Ryu, Hwaseong-si (KR); Seung Jun Yeon, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 222 days.

(21) Appl. No.: 17/073,559

(22) Filed: Oct. 19, 2020

(65) Prior Publication Data
US 2021/0408563 A1 Dec. 30, 2021

(30) Foreign Application Priority Data

Jun. 26, 2020 (KR) ........................ 10-2020-0078307

(51) Int. Cl.
*H01M 8/04082* (2016.01)
*B60L 50/72* (2019.01)
*B60L 58/40* (2019.01)
*B60L 50/71* (2019.01)

(52) U.S. Cl.
CPC ......... *H01M 8/04201* (2013.01); *B60L 50/71* (2019.02); *B60L 50/72* (2019.02); *B60L 58/40* (2019.02); *H01M 2250/20* (2013.01)

(58) Field of Classification Search
CPC .......... H01M 8/04201; H01M 2250/20; B60L 50/71; B60L 50/72; B60L 50/75; B60L 58/40; B60L 2200/36; B60L 2200/40; B60L 2200/44
See application file for complete search history.

(56) References Cited

U.S. PATENT DOCUMENTS

2002/0187376 A1* 12/2002 Nishiumi ............ H01M 8/0247
429/431
2020/0331536 A1* 10/2020 Sloan ................... B62D 25/088

FOREIGN PATENT DOCUMENTS

CN 108099677 A 6/2018

* cited by examiner

*Primary Examiner* — Adam A Arciero
(74) *Attorney, Agent, or Firm* — Lempia Summerfield Katz LLC

(57) ABSTRACT

A fuel cell vehicle includes a battery disposed in a first space, a radiator disposed in a second space formed adjacent to the first space in a second direction intersecting a first direction, which is a direction in which the vehicle travels, and at least one fuel cell unit disposed in a third space formed adjacent to the first space in the second direction while being spaced apart from the second space in the second direction, with the first space interposed therebetween.

17 Claims, 11 Drawing Sheets

FUEL CELL VEHICLE

CROSS-REFERENCE TO RELATED APPLICATION

This application claims priority to and the benefit of Korean Patent Application No. 10-2020-0078307, filed on Jun. 26, 2020, the entire contents of which are hereby incorporated by reference.

FIELD

The present disclosure relates to a vehicle including a fuel cell.

BACKGROUND

The statements in this section merely provide background information related to the present disclosure and may not constitute prior art.

Because commercial vehicles such as trucks and buses are heavier and larger than automobiles, a relatively large amount of output, e.g. about 200 kW or more, is required in order to drive commercial vehicles. Thus, it may be impossible or difficult to drive a commercial vehicle using only one fuel cell of the type used in automobiles. Therefore, research thereon is being actively conducted.

SUMMARY

The present disclosure provides a fuel cell vehicle in which a fuel cell is efficiently mounted.

A fuel cell vehicle according to one form may include: a battery disposed in a first space of the fuel cell vehicle, a radiator disposed in a second space arranged adjacent to the first space in a second direction intersecting a first direction, which is a direction in which the fuel cell vehicle travels, and at least one fuel cell unit disposed in a third space arranged adjacent to the first space in the second direction while being spaced apart from the second space in the second direction, with the first space interposed therebetween.

In one form, the radiator may be lighter than the battery, and the at least one fuel cell unit may be lighter than the battery.

In another form, a first weight difference between the first weight of the radiator and the second weight of the at least one fuel cell unit may be less than a second weight difference between the third weight of the battery and the first weight, and the first weight difference may be less than a third weight difference between the third weight and the second weight.

In some forms of the present disclosure, the at least one fuel cell unit may include a plurality of fuel cell units, and each of the plurality of fuel cell units may include a fuel cell, a fluid supply unit configured to supply a fluid to the fuel cell, an electronic unit electrically connected to the fuel cell, and a controller configured to control the electronic unit and the fluid supply unit.

In some forms of the present disclosure, the radiator may dissipate heat from coolant that cools the fuel cell, the battery, and the motor of the fuel cell vehicle.

In some forms of the present disclosure, the fuel cell vehicle may further include first and second body frames extending in the first direction and disposed opposite to each other while being spaced apart from each other in the second direction. When viewed in plan, the first space may overlap the space between the first and second body frames, the second space may be located outside the first body frame, and the third space may be located outside the second body frame.

In some forms of the present disclosure, the third space may be located between the top surface of the second body frame and the bottom surface of the fuel cell vehicle.

In some forms of the present disclosure, the top surface of the at least one fuel cell unit may be lower than the top surface of the second body frame.

In some forms of the present disclosure, the fuel cell vehicle may further include a cab and a loading part located behind the cab. The bottom surface of the loading part may be higher than the top surface of each of the first and second body frames.

In some forms of the present disclosure, the fuel cell vehicle may further include a hydrogen storage part located between the cab and the loading part in the first direction. The bottom surface of the hydrogen storage part may be higher than the top surface of each of the first and second body frames.

In some forms of the present disclosure, the battery may be spaced apart from the front axle by a first distance in the first direction, the radiator may be spaced apart from the front axle by a second distance in the first direction, the at least one fuel cell unit may be spaced apart from the front axle by a third distance in the first direction, and the first distance may be greater than each of the second and third distances.

In some forms of the present disclosure, the fuel cell vehicle may further include a front mudguard disposed at a front side of the fuel cell vehicle and a rear mudguard disposed at a rear side of the fuel cell vehicle. The at least one fuel cell unit may be disposed in the third space located outside the second body frame between the front mudguard and the rear mudguard.

In some forms of the present disclosure, the fuel cell vehicle may further include a system-mounting frame mounted to the second body frame. The system-mounting frame may be configured to allow the at least one fuel cell unit to be loaded thereon.

In some forms of the present disclosure, the system-mounting frame may be disposed in the third space.

In one form, the at least one fuel cell unit may be loaded on the system-mounting frame so as to be mounted and demounted in at least one of an upward direction, a downward direction, or the second direction.

In another form, the fuel cell vehicle may further include a side protector disposed to face an outer surface of the at least one fuel cell unit, which is opposite an inner surface of the at least one fuel cell unit that faces the second body frame.

In some forms of the present disclosure, the side protector may be disposed in the third space.

In some forms of the present disclosure, the side protector may be mounted to the system-mounting frame.

In some forms of the present disclosure, a distance by which the first and second body frames are spaced apart from each other in the second direction may gradually decrease from the front side to the rear side of the vehicle, and a distance by which the side protector is spaced apart from the second body frame in the second direction may gradually increase from the front side to the rear side of the vehicle.

In some forms of the present disclosure, a distance by which the first and second body frames are spaced apart from each other in the second direction may gradually increase from the front side to the rear side of the vehicle, and a distance by which the side protector is spaced apart from the second body frame in the second direction may gradually decrease from the front side to the rear side of the vehicle.

In another form, the fuel cell vehicle may further include a first mount insulator disposed between a fuel cell frame, which supports the components of the at least one fuel cell unit, and the system-mounting frame, and a first engagement part for engaging one side of the first mount insulator and the fuel cell frame with each other. The opposite side of the first mount insulator may be engaged with the system-mounting frame in an interference-fit manner.

In some forms of the present disclosure, the first mount insulator and the first engagement part may be disposed at each of a plurality of corner portions of the fuel cell frame.

In some forms of the present disclosure, the fuel cell vehicle may further include an individual mounting bracket having one side secured to the fuel cell frame, which supports the components of the at least one fuel cell unit, a second mount insulator disposed between the individual mounting bracket and the system-mounting frame, and a second engagement part for engaging the opposite side of the individual mounting bracket and one side of the second mount insulator with each other. The opposite side of the second mount insulator may be engaged with the system-mounting frame in an interference-fit manner.

In some forms of the present disclosure, the individual mounting bracket, the second mount insulator, and the second engagement part may be disposed at at least one of the plurality of corner portions of the fuel cell frame.

In some forms of the present disclosure, the at least one fuel cell unit may include a plurality of fuel cell units arranged in the first direction, and each of the plurality of fuel cell units may include a fuel cell frame for supporting the components of the fuel cell unit. The fuel cell vehicle according to another form may further include a common mounting bracket secured in common to the plurality of fuel cell frames of the plurality of fuel cell units disposed adjacent to each other, a third mount insulator disposed between the common mounting bracket and the system-mounting frame, and a third engagement part for engaging the common mounting bracket and one side of the third mount insulator with each other. The opposite side of the third mount insulator may be engaged with the system-mounting frame in an interference-fit manner.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
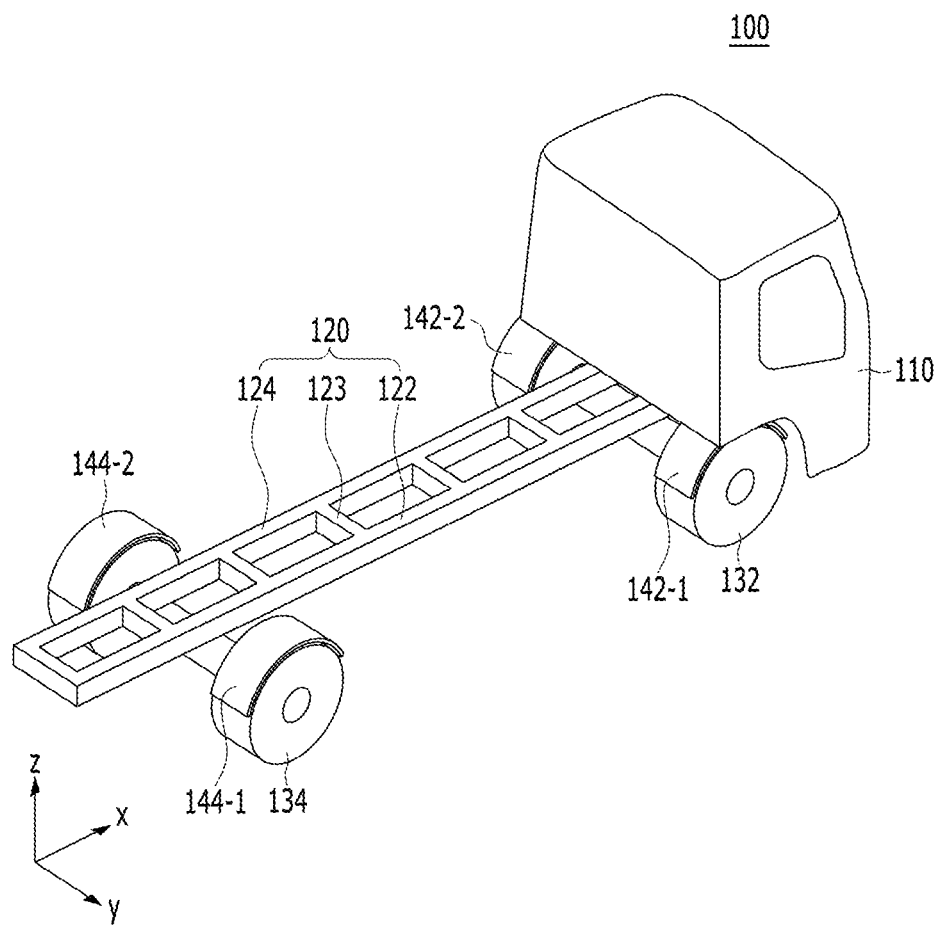
FIG. 1 is a perspective view showing the external appearance of a fuel cell vehicle according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will now be described more fully hereinafter with reference to the accompanying drawings, in which various forms are shown. The examples, however, may be embodied in many different forms and should not be construed as being limited to the forms set forth herein. Rather, these forms are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, fuel cell vehicles 100 (100A, 100B and 100C) according to exemplary forms of the present disclosure will be described with reference to the accompanying drawings. The fuel cell vehicles 100 (100A, 100B and 100C) will be described using the Cartesian coordinate system (x-axis, y-axis, z-axis) for convenience of description, but may also be described using other coordinate systems.

In the Cartesian coordinate system, the x-axis, the y-axis, and the z-axis are perpendicular to each other, but the form is not limited thereto. That is, the x-axis, the y-axis, and the z-axis may intersect each other obliquely. In the following description, the term "first direction" refers to at least one of the +x-axis direction or the −x-axis direction, the term "second direction" refers to at least one of the +y-axis direction or the −y-axis direction, and the term "third direction" refers to at least one of the +z-axis direction or the −z-axis direction. The term "lower side" may refer to the direction of gravity, which is oriented toward the ground (or a road), and the term "upper side" may refer to the direction that is oriented away from the ground, i.e. the direction opposite that indicated by the term "lower side". The term "front side" may refer to the direction in which the vehicles 100 (100A, 100B and 100C) move forwards, and the term "rear side" may refer to the direction in which the vehicles 100 (100A, 100B and 100C) move backwards, i.e. the direction opposite that indicated by the term "front side".

Hereinafter, a fuel cell vehicle (hereinafter referred to as a "vehicle") 100 according to one form of the present disclosure will be described with reference to the accompanying drawings.

Figure 2:
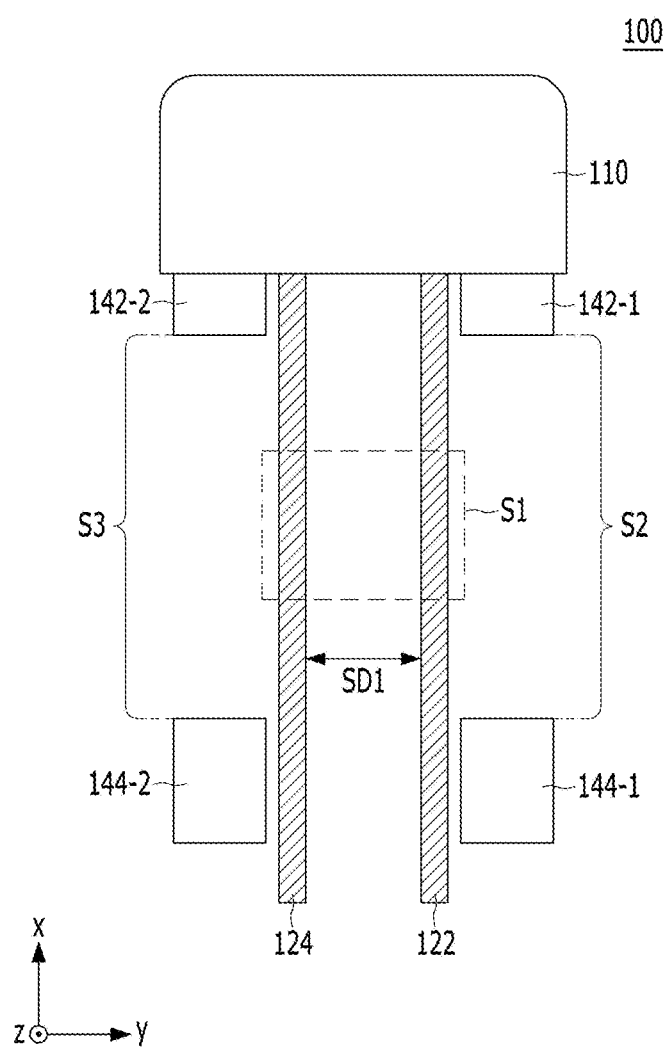
FIG. 2 is a plan view of the fuel cell vehicle shown in FIG. 1.
Figure 3:
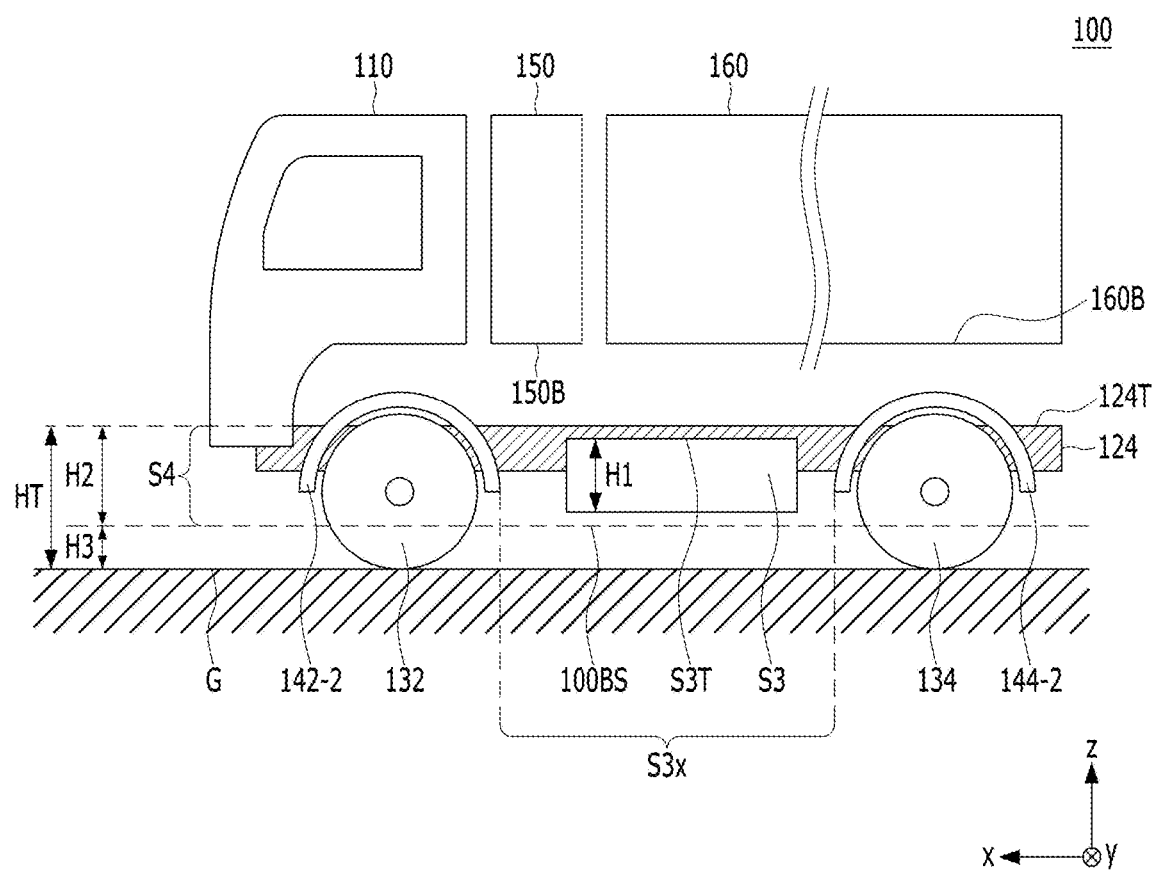
FIG. 3 is a side view of the fuel cell vehicle shown in FIG. 1.

FIG. 1 is a perspective view showing the external appearance of the vehicle 100, FIG. 2 is a plan view of the vehicle 100 shown in FIG. 1, and FIG. 3 is a side view of the vehicle 100 shown in FIG. 1.

The vehicle 100 may include a battery, a radiator, and at least one fuel cell unit (or power module complete (PMC)).

The vehicle 100 may correspond to a commercial vehicle such as a truck or a bus, which is heavier or larger than an automobile. To this end, in the vehicle 100, the at least one fuel cell unit may include a plurality of fuel cell units. The vehicle 100 may include a battery, a radiator, and a plurality of fuel cell units.

In the fuel cell vehicle 100, the battery may be disposed in a first space S1, the radiator may be disposed in a second space S2, and the at least one fuel cell unit may be disposed in a third space S3. Alternatively, the radiator may be disposed in the third space S3, and the at least one fuel cell unit may be disposed in the second space S2.

Hereinafter, the vehicle 100 will be described as being structured such that the battery is disposed in the first space S1, the radiator is disposed in the second space S2, and the at least one fuel cell unit is disposed in the third space S3. However, the following description is also applicable to a structure in which the radiator is disposed in the third space S3 and the at least one fuel cell unit is disposed in the second space S2.

In order to promote an understanding of the space S1, the second space S2, and the third space S3, illustrations of the battery, the radiator, and the at least one fuel cell unit are omitted from FIGS. 1 to 3.

Prior to the first and third spaces S1 to S3, the construction of the vehicle 100 will be described briefly.

The vehicle 100 may include a cab (or cabin room) 110, a vehicle chassis 120, front wheels 132, rear wheels 134, front mudguards 142-1 and 142-2, and rear mudguards 144-1 and 144-2. Here, the cab 110, the vehicle chassis 120, the front wheels 132, the rear wheels 134, the front mudguards 142-1 and 142-2, and the rear mudguards 144-1 and 144-2 are merely an example for promoting an understanding of the vehicle 100. That is, the vehicle 100 is not limited as to the specific positions of the cab 110, the vehicle chassis 120, the front wheels 132, the rear wheels 134, the front mudguards 142-1 and 142-2, and the rear mudguards 144-1 and 144-2 shown in FIGS. 1 to 3.

The cab 110 is a part in which a driver's seat is mounted.

The vehicle chassis 120 may include first and second body frames 122 and 124, which form the framework of the vehicle 100 from the front side to the rear side of the vehicle 100. In another form, the vehicle chassis 120 may further include at least one cross member 123.

The first and second body frames 122 and 124 may extend in the first direction (or forwards or backwards), in which the vehicle 100 travels (or heads), and may be disposed opposite each other while being spaced apart from each other in the second direction, which intersects the first direction. In this case, the at least one cross member 123 is a part that is disposed (or located) between the first body frame 122 and the second body frame 124 in the vehicle chassis 120. The at least one cross member 123 may be integrally formed with at least one of the first body frame 122 or the second body frame 124. However, the vehicle 100 is not limited as to the presence or absence of the cross member 123, the specific position thereof, or the specific shape thereof.

The front mudguards 142-1 and 142-2 are disposed at the front side of the vehicle 100. For example, the front mudguards 142-1 and 142-2 are disposed so as to be spaced apart from the front wheels 132 around the upper portions and the side portions of the front wheels 132, and serve to prevent water or mud from splashing to the front side or the rear side of the vehicle 100 when the front wheels 132 rotate.

The rear mudguards 144-1 and 144-2 are disposed at the rear side of the vehicle 100. For example, the rear mudguards 144-1 and 144-2 are disposed so as to be spaced apart from the rear wheels 134 around the upper portions and the side portions of the rear wheels 134, and serve to prevent water or mud from splashing to the front side or the rear side of the vehicle 100 when the rear wheels 134 rotate.

Hereinafter, the first to third spaces S1, S2 and S3 will be described.

The first space S1 is located between the second space S2 and the third space S3 in the second direction. The second space S2 is located adjacent to the first space S1 in the second direction. The third space S3 is spaced apart from the second space S2 in the second direction, with the first space S1 interposed therebetween, and is located adjacent to the first space S1 in the second direction.

The first to third spaces S1 to S3 will be described in more detail with reference to the first and second body frames 122 and 124.

Referring to FIG. 2, when viewed in plan, the first space S1 may overlap the space between the first and second body frames 122 and 124 in the third direction. The length of the first space S1 in the second direction may be less than, greater than, or equal to a first distance SD1 between the first and second body frames 122 and 124, which are spaced apart from each other in the second direction.

In one form, the second space S2 may be adjacent to the first space S1 in the second direction, and may be located outside the first body frame 122. The third space S3 may be spaced apart from the second space S2 in the second direction, with the first space S1 interposed therebetween. The third space S3 may be adjacent to the first space S1 in the second direction, and may be located outside the second body frame 124.

The second and third spaces S2 and S3 according to another form will now be described with reference to the first and second body frames 122 and 124, the front mudguards 142-1 and 142-2, and the rear mudguards 144-1 and 144-2.

Referring to FIG. 2, when viewed in plan, the second space S2 may be adjacent to the first space S1 in the second direction, and may be located outside the first body frame 122. Further, the second space S2 may be located between the front mudguard 142-1 and the rear mudguard 144-1 in the first direction. Referring to FIGS. 2 and 3, the third space S3 may be spaced apart from the second space S2 in the second direction, with the first space S1 interposed therebetween. The third space S3 may be adjacent to the first space S1 in the second direction, and may be located outside the second body frame 124. Further, as shown in FIG. 3, the third space S3 may be a space S3x located between the front mudguard 142-2 and the rear mudguard 144-2 in the first direction.

Further, the third space S3 may be defined as follows in the third direction.

Referring to FIG. 3, the third space S3 may be a space located in a fourth space S4 between the top surface 124T of the second body frame 124 and the bottom surface 100BS of the vehicle 100.

Referring to FIG. 3, the vehicle 100 may further include a hydrogen storage part 150 and a loading part 160. Alternatively, unlike the illustration in FIG. 3, the vehicle 100 may include only the loading part 160, and may not include the hydrogen storage part 150. That is, the hydrogen storage part 150 may be omitted.

Further, the hydrogen storage part 150 may be disposed at any of various positions other than the position shown in FIG. 3. The vehicle 100 is not limited as to the specific position of the hydrogen storage part 150.

The loading part 160 may be located behind the cab 110 in the vehicle 100. When the vehicle 100 is a truck, which is a commercial vehicle, the loading part 160 may provide a space in which cargo is loaded, and when the vehicle 100 is a bus, the loading part 160 may provide a space that passengers occupy.

Referring to FIG. 3, the loading part 160 is illustrated as being of a closed type that has a rectangular-shaped cross-section, but the form is not limited thereto. That is, according to another form, unlike the illustration in FIG. 3, the loading part 160 may have an open-type cross-section that has an open upper portion.

The hydrogen storage part 150 may be located between the cab 110 and the loading part 160 in the first direction, and may store hydrogen required for the at least one fuel cell unit as fuel of the vehicle 100. Although not shown, the vehicle 100 shown in FIG. 3 may further include pipes for supplying hydrogen from the hydrogen storage part 150 to the at least one fuel cell unit.

The cab 110 and the loading part 160 may be supported by the first and second body frames 122 and 124. Similarly, the hydrogen storage part 150 may also be supported by the first and second body frames 122 and 124.

In addition, the cross member 123 may serve to support at least one of the cab 110, the loading part 160, or the hydrogen storage part 150. Alternatively, the cross member 123 may support none of the cab 110, the loading part 160, and the hydrogen storage part 150, or may be omitted.

The third space S3 described above may be defined as a space in which the at least one fuel cell unit is disposed.

In one form, the third space S3 may be defined as including a space in which the at least one fuel cell unit is disposed and a space in which a system-mounting frame 410, which will be described later, and which is provided in order to mount the at least one fuel cell unit to the fuel cell vehicle 100, is disposed.

Alternatively, the third space S3 may be defined as including a space in which the at least one fuel cell unit is disposed, a space in which the system-mounting frame 410 is disposed, and a space in which a side protector 420, which will be described later, and which is provided in order to protect the at least one fuel cell unit, is disposed.

The following description is applicable to any of the above three types of third space S3.

Hereinafter, the position of the third space S3 in the vehicle 100 will be described with reference to FIG. 3.

The third space S3 may have a first height H1 in the third direction, and may be located within the fourth space S4 defined from the top surface 124T of the second body frame 124 to the bottom surface 100BS of the vehicle 100. The fourth space S4 is defined as having a second height H2, the minimum ground clearance of the vehicle 100 is defined as a third height H3, and the distance from the top surface 124T of the second body frame 124 to the ground G in the third direction is defined as a total height HT.

The total height HT is equal to the sum of the second height H2 and the third height H3. Here, the minimum ground clearance of the vehicle 100 is a height set from the ground G to the bottom surface 100BS of the vehicle 100 in the third direction in order to protect the bottom of the vehicle 100 from bumps on the ground G. Considering this, the third space S3 may be located within the fourth space S4, which has the second height H2, which is set by subtracting the third height H3, which is the minimum ground clearance, from the total height HT. That is, the at least one fuel cell unit, the system-mounting frame, and the side protector may be located in the fourth space S4.

In the fourth space S4, the top S3T of the third space S3 may be lower than the top surface 124T of the second body frame 124.

As described above, when the top S3T of the third space S3 is lower than the top surface 124T of the second body frame 124 in the fourth space S4, the stability of the vehicle 100 is improved. In the case in which the vehicle 100 is a trailer-type vehicle, when the vehicle 100 makes a turn or travels on an uphill or downhill road, at least one of the hydrogen storage part 150 or the loading part 160 tilts. For this reason, if the top S3T of the third space S3 is not lower than the top surface 124T of the second body frame 124, the stability of the vehicle 100 may be deteriorated.

Further, when the third space S3 becomes close to the ground G due to, for example, bumps on the ground G, the at least one fuel cell unit, the system-mounting frame, and the side protector, which are disposed in the third space S3, may be damaged. Considering this, the arrangement of the at least one fuel cell unit, the system-mounting frame, and the side protector in the third space S3, which is located within the fourth space S4, may be determined.

In addition, the bottom surface 160B of the loading part 160 may be higher than the top surfaces 122T and 124T of the first and second body frames 122 and 124. Similarly, the bottom surface 150B of the hydrogen storage part 150 may be higher than the top surfaces 122T and 124T of the first and second body frames 122 and 124.

For example, on the assumption that, among the at least one fuel cell unit, the system-mounting frame, and the side protector, which are disposed in the third space S3, the part having the largest height from the ground G is the at least one fuel cell unit, when the top surface of the at least one fuel cell unit is lower than the top surface 124T of the second body frame 124, when the bottom surface 160B of the loading part 160 is higher than the top surface 124T of the second body frame 124, and when the bottom surface 150B of the hydrogen storage part 150 is higher than the top surface 124T of the second body frame 124, the space occupied by the loading part 160 and the space occupied by the hydrogen storage part 150 may be increased without being influenced by the at least one fuel cell unit, and the freedom of arrangement of the loading part 160 and the hydrogen storage part 150 may be improved. Accordingly, the amount of cargo that is capable of being loaded in the loading part 160 (or the number of passengers that are capable of riding in the vehicle when the vehicle is a bus) may increase. Further, the amount of hydrogen that is capable of being stored in the hydrogen storage part 150 may increase, and thus the distance that the vehicle 100 is capable of traveling may increase.

In the case in which the hydrogen storage part 150 is omitted and the loading part 160 is extended to the space for the hydrogen storage part 150, the space occupied by the loading part 160 may further increase.

In the case in which the first space S1 is located between the second space S2 and the third space S3 in the second direction, as described above, and the battery is heavier than each of the radiator and the at least one fuel cell unit, the weight of the vehicle 100 may be distributed in a balanced manner.

For example, when the weight of the radiator is defined as a first weight, the weight of the at least one fuel cell unit is defined as a second weight, and the weight of the battery is defined as a third weight, the difference between the first weight and the second weight (hereinafter referred to as a "first weight difference") may be less than each of the difference between the third weight and the first weight (hereinafter referred to as a "second weight difference"), and the first weight difference may be less than the difference between the third weight and the second weight (hereinafter referred to as a "third weight difference").

The first weight may vary depending on the role of the radiator, and the second weight may vary depending on the number of fuel cell units included in the at least one fuel cell unit and the configuration of each fuel cell unit. Examples of the first to third weights will be described below.

The at least one fuel cell unit described above may include a plurality of fuel cell units arranged in the first direction. When the fuel cell vehicle according to one form includes a plurality of fuel cell units, the plurality of fuel cell units may meet the high output requirements of the vehicle, whereby the vehicle is capable of traveling a longer distance and carrying a larger amount of cargo or a larger number of passengers.

Figure 4:
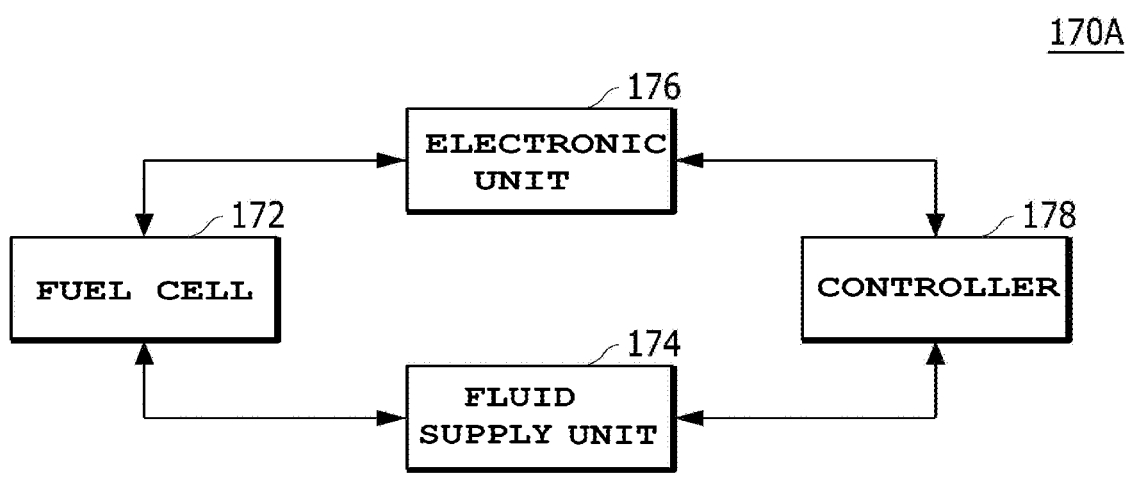
FIG. 4 is a block diagram of one fuel cell unit.

FIG. 4 is a block diagram of one fuel cell unit 170A.

Referring to FIG. 4, each 170A of the plurality of fuel cell units may include a fuel cell 172, a fluid supply unit 174, an electronic unit 176, and a controller 178.

Hereinafter, an example of the fuel cell 172 included in the vehicle 100 in one form will be described with reference to FIG. 5. However, the vehicle 100 in another form may include a fuel cell 172 having any of various configurations other than the configuration shown in FIG. 5.

Figure 5:
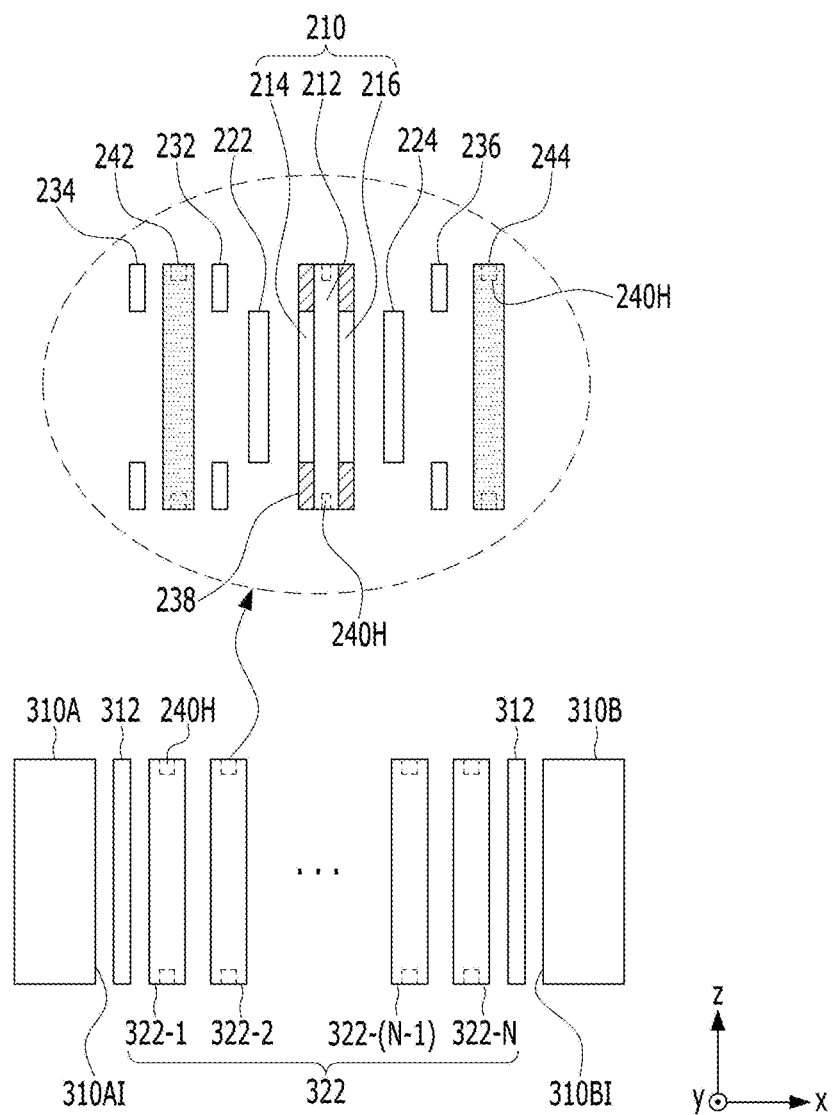
FIG. 5 is an exemplary cross-sectional view of a fuel cell included in a fuel cell unit in one form of the present disclosure.

FIG. 5 is an exemplary cross-sectional view of the fuel cell 172 included in the fuel cell unit 170A in one form.

The fuel cell may be, for example, a polymer electrolyte membrane fuel cell (or a proton exchange membrane fuel cell) (PEMFC), which has been studied most extensively as a power source for driving vehicles.

The fuel cell may include first and second end plates (or pressing plates or compression plates) 310A and 310B, current collectors 312, and a cell stack 322.

The cell stack 322 may include a plurality of unit cells 322-1 to 322-N, which are stacked in the first direction. Here, "N" is a positive integer of 1 or greater, and may range from several tens to several hundreds. However, the form is not limited to any specific value of "N".

Each unit cell 322-$n$ (where $1 \leq n \leq N$) may generate 0.6 volts to 1.0 volts of electricity. Thus, "N" may be determined depending on the intensity of the power to be supplied from the fuel cell 172 to a load. Here, "load" may refer to a part of the vehicle 100 that requires power.

In particular, the vehicle 100 may be a commercial vehicle, which requires a large amount of power, like a bus, a truck, or the like. In order to meet the requirements for a large amount of driving power, the vehicle 100 may include multiple (e.g. two) fuel cell units.

Each unit cell 322-$n$ may include a membrane electrode assembly (MEA) 210, gas diffusion layers (GDLs) 222 and 224, gaskets 232, 234 and 236, and separators (or bipolar plates) 242 and 244.

The membrane electrode assembly 210 has a structure in which catalyst electrode layers, in which electrochemical reaction occurs, are attached to both sides of an electrolyte membrane through which hydrogen ions move. Specifically, the membrane electrode assembly 210 may include a polymer electrolyte membrane (or a proton exchange membrane) 212, a fuel electrode (or a hydrogen electrode or an anode) 214, and an air electrode (or an oxygen electrode or a cathode) 216. In addition, the membrane electrode assembly 210 may further include a sub-gasket 238.

The polymer electrolyte membrane 210 is disposed between the fuel electrode 214 and the air electrode 216.

Hydrogen, which is the fuel in the fuel cell, may be supplied to the fuel electrode 214 through the first separator 242, and air containing oxygen as an oxidizer may be supplied to the air electrode 216 through the second separator 244.

The hydrogen supplied to the fuel electrode 214 is decomposed into hydrogen ions (protons) (H+) and electrons (e−) by the catalyst. Only the hydrogen ions may be selectively transferred to the air electrode 216 through the polymer electrolyte membrane 212, and at the same time, the electrons may be transferred to the air electrode 216 through the gas diffusion layers 222 and 224 and the first and second separators 242 and 244, which are conductors. In order to realize the above operation, a catalyst layer may be applied to each of the fuel electrode 214 and the air electrode 216. The movement of the electrons described above causes the electrons to flow through an external wire, thus generating current. That is, the fuel cell may generate power due to the electrochemical reaction between hydrogen, which is the fuel, and oxygen contained in the air.

In the air electrode 216, the hydrogen ions supplied through the polymer electrolyte membrane 212 and the electrons transferred through the first and second separators 242 and 244 meet oxygen in the air supplied to the air electrode 216, thus causing a reaction that generates water (hereinafter referred to as "product water"). The product water generated in the air electrode 216 may penetrate the polymer electrolyte membrane 212 and may be transferred to the fuel electrode 214.

The first and second gas diffusion layers 222 and 224 serve to uniformly distribute hydrogen and oxygen, which are reactant gases, and to transfer the generated electric energy. To this end, the first and second gas diffusion layers 222 and 224 may be disposed on respective sides of the membrane electrode assembly 210. The first gas diffusion layer 222 may serve to diffuse and uniformly distribute hydrogen supplied as a reactant gas through the first separator 242, and may be electrically conductive. The second gas diffusion layer 224 may serve to diffuse and uniformly distribute air supplied as a reactant gas through the second separator 244, and may be electrically conductive.

The gaskets 232, 234 and 236 may serve to maintain the airtightness and clamping pressure of the cell stack at an appropriate level with respect to the reactant gases and the coolant, to disperse the stress when the first and second separators 242 and 244 are stacked, and to independently seal the flow paths. As such, since airtightness and watertightness are maintained by the gaskets 232, 234 and 236, the flatness of the surfaces that are adjacent to the cell stack 322, which generates power, may be secured, and thus surface pressure may be distributed uniformly over the reaction surfaces of the cell stack 322.

The first and second separators 242 and 244 may serve to move the reactant gases and the cooling medium and to separate each of the unit cells from the other unit cells. In addition, the first and second separators 242 and 244 may serve to structurally support the membrane electrode assembly 210 and the gas diffusion layers 222 and 224 and to collect the generated current and transfer the collected current to the current collectors 312.

The first and second separators 242 and 244 may be spaced apart from each other in the first direction and may be disposed outside the first and second gas diffusion layers 222 and 224, respectively. That is, the first separator 242 may be disposed on the left side of the first gas diffusion layer 222, and the second separator 244 may be disposed on the right side of the second gas diffusion layer 224.

The first separator 242 serves to supply hydrogen as a reactant gas to the fuel electrode 214 through the first gas diffusion layer 222. The second separator 244 serves to supply air as a reactant gas to the air electrode 216 through the second gas diffusion layer 224. In addition, each of the first and second separators 242 and 244 may form a channel through which the cooling medium (e.g. coolant) may flow.

Each of the first and second end plates 310A and 310B may be disposed at a respective one of both ends of the cell stack 322, and may support and fix the plurality of unit cells. That is, the first end plate 310A may be disposed at one end of the cell stack 322, and the second end plate 310B may be disposed at the opposite end of the cell stack 322.

The current collectors 312 may be disposed between the cell stack 322 and the inner surfaces 310AI and 310BI of the first and second end plates 310A and 310B that are opposite the cell stack 322. The current collectors 312 serve to collect the electric energy generated by the flow of electrons in the cell stack 322 and to supply the electric energy to a load of the vehicle 100 that uses the fuel cell.

Referring again to FIG. 4, the fluid supply unit 174 serves to supply fluid to the fuel cell 172. To this end, the fluid supply unit 174 may include an air supply system for supplying air containing moisture to the fuel cell 172, a hydrogen supply system for supplying hydrogen to the fuel cell 172, and a coolant supply system for supplying coolant to the fuel cell 172.

The electronic unit 176 is a part that is electrically connected to the fuel cell 172. For example, the electronic unit 176 may include a junction box and a direct-current (DC)/direct-current (DC) converter (or a fuel cell DC/DC converter (FDC)).

The controller 178 serves to control the fluid supply unit 174 and the electronic unit 176.

The radiator serves to dissipate heat from the coolant that cools the fuel cell 172 included in each of the plurality of fuel cell units, the battery, and the motor of the vehicle 100.

When the plurality of fuel cell units includes two fuel cell units, when each of the two fuel cell units has the above-described configuration, and when the radiator performs the above-described function, the radiator may have the first weight of, for example, about 400 kg, the two fuel cell units may have the second weight of, for example, about 500 kg, and the battery may have the third weight of, for example, about 800 kg.

The weight of the vehicle 100 may be balanced when the battery, which has the greatest third weight, is disposed in the first space S1, and the radiator and the fuel cell units, which respectively have the first weight and the second weight and which are similar to each other, are respectively disposed in the second space S2 and the third space S3, with the first space S1 interposed therebetween.

Hereinafter, one form of the present disclosure in which the battery, the radiator, and the at least one fuel cell unit are respectively disposed in the above-described first, second, and third spaces S1, S2 and S3 will be described.

Figure 6:
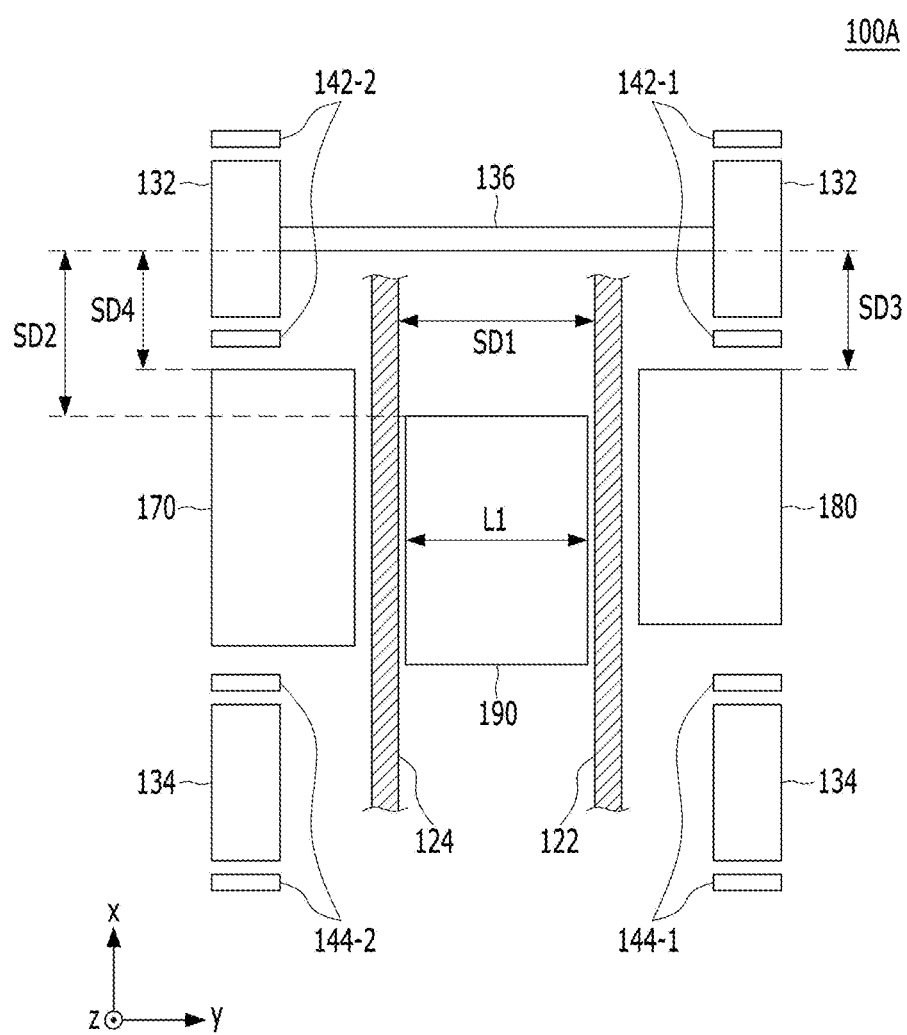
FIG. 6 is a plan view of a fuel cell vehicle according to one form of the present disclosure.
Figure 7:
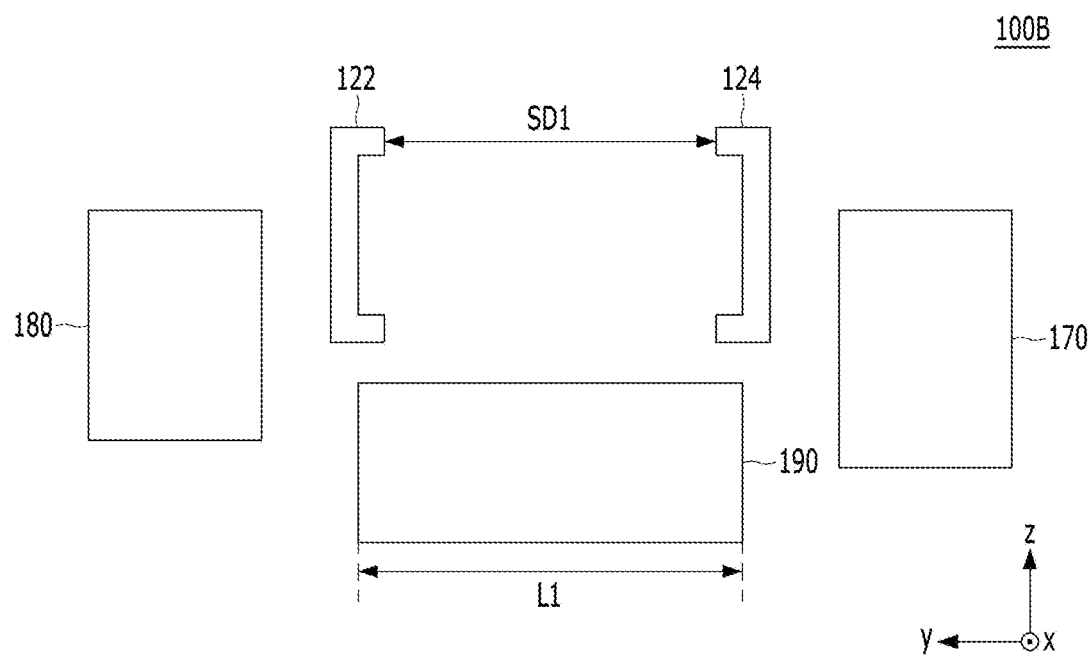
FIG. 7 is a front view of a fuel cell vehicle according to another form of the present disclosure.

FIG. 6 is a plan view of a vehicle 100A according to one form, and FIG. 7 is a front view of a vehicle 100B according to another form.

Although each of the at least one fuel cell unit 170, the radiator 180, and the battery 190 is illustrated in FIG. 6 as having a rectangular planar shape, the form is not limited thereto. Hereinafter, although each of the at least one fuel cell unit 170, the radiator 180, and the battery 190 will be described as having a rectangular planar shape, as shown in FIG. 6, the following description is also applicable to the case in which each of the at least one fuel cell unit 170, the radiator 180, and the battery 190 has any of various planar shapes other than the rectangular planar shape.

For example, referring to FIG. 6, the battery 190 may be spaced apart from a front axle 136 by a second distance SD2 in the first direction, the radiator 180 may be spaced apart from the front axle 136 by a third distance SD3 in the first direction, and the at least one fuel cell unit 170 may be spaced apart from the front axle 136 by a fourth distance SD4 in the first direction.

In this case, the second distance SD2 may be greater than each of the third and fourth distances SD3 and SD4.

As shown in FIG. 6, when the first distance SD1, by which the first and second body frames 122 and 124 are spaced apart from each other in the second direction, is greater than the first length L1 of the battery 190 in the second direction, the battery 190 may be disposed between the first and second body frames 122 and 124.

Alternatively, when the first distance SD1, by which the first and second body frames 122 and 124 are spaced apart from each other in the second direction, is less than or equal to the first length L1 of the battery 190 in the second direction, the battery 190 may not be disposed between the first and second body frames 122 and 124, but may be disposed under the first and second body frames 122 and 124 when viewed from the front, as shown in FIG. 7.

Further, the space between the first and second body frames 122 and 124 may overlap the first space S1 in the third direction, regardless of the sizes of the first distance SD1 and the first length L1.

Hereinafter, the at least one fuel cell unit 170 of the vehicle 100 will be described as including two fuel cell units, namely first and second fuel cell units 170-1 and 170-2, which are arranged in the first direction, but the form is not limited thereto. That is, the following description is also applicable to the case in which the vehicle 100 includes one or three or more fuel cell units.

Figure 8:
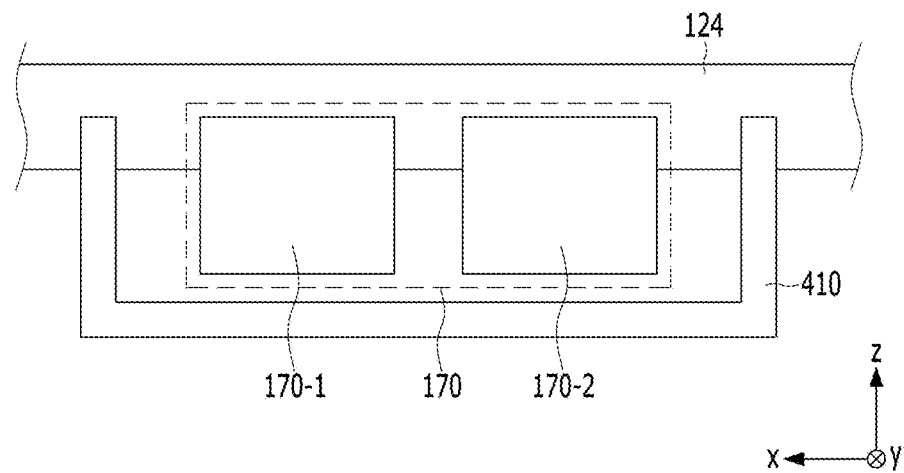
FIG. 8 is a side view of at least one fuel cell unit mounted in a fuel cell vehicle in one form of the present disclosure.

FIG. 8 is a side view of at least one fuel cell unit 170 which is mounted in the vehicle 100.

The vehicle 100 according to one form may further include a system-mounting frame 410. The system-mounting frame 410 may be mounted to the second body frame 124, and may provide a space in which the first and second fuel cell units 170-1 and 170-2 are mounted. In addition, as described above, the system-mounting frame 410 may be disposed in the third space S3.

Hereinafter, a method of producing the fuel cell vehicle 100 according to another form will be described.

First, as a method of initially mounting the first and second fuel cell units 170-1 and 170-2 to the vehicle 100, the first and second fuel cell units 170-1 and 170-2 may be mounted to the system-mounting frame 410 in the third direction, i.e. in the downward direction.

Thereafter, the hydrogen storage part 150 is mounted above the first and second fuel cell units 170-1 and 170-2. However, when the hydrogen storage part 150 is omitted and the loading part 160 is disposed in the space for the hydrogen storage part 150, the loading part 160 is mounted above the first and second fuel cell units 170-1 and 170-2.

Hereinafter, a method of demounting the first and second fuel cell units 170-1 and 170-2, which have been initially mounted in the vehicle 100, from the vehicle 100 in order to preform maintenance/repair and re-mounting the demounted first and second fuel cell units 170-1 and 170-2 to the vehicle 100 will be described.

According to one form, when the vehicle 100 includes the hydrogen storage part 150, as shown in FIG. 3, the first and second fuel cell units 170-1 and 170-2 may be dismantled from the system-mounting frame 410, and may then be withdrawn in the second direction. Thereafter, when maintenance/repair is completed, the first and second fuel cell units 170-1 and 170-2 may be inserted in the second direction to be mounted to the system-mounting frame 410.

According to another form, when the vehicle 100 does not include the hydrogen storage part 150, unlike the illustration in FIG. 3, the first and second fuel cell units 170-1 and 170-2 may be dismantled from the system-mounting frame 410, and may then be withdrawn in the upward direction or in the second direction. Thereafter, when maintenance/repair is completed, the first and second fuel cell units 170-1 and 170-2 may be inserted in the downward direction or in the second direction to be mounted to the system-mounting frame 410.

In conclusion, according to one form, at least one of the first or second fuel cell unit 170-1 or 170-2 may be mounted to the system-mounting frame 410 so as to be mounted and demounted in at least one of the upward direction, the downward direction, or the second direction.

For example, each of the first and second fuel cell units 170-1 and 170-2 may be mounted to the system-mounting frame 410 so as to be mounted and demounted in at least one of the upward direction, the downward direction, or the second direction. Alternatively, one of the first and second fuel cell units 170-1 and 170-2 may be mounted to the system-mounting frame 410 so as to be mounted and demounted in the upward or downward direction, and the other one of the first and second fuel cell units 170-1 and 170-2 may be mounted to the system-mounting frame 410 so as to be mounted and demounted in the second direction.

In conclusion, in the vehicle 100 according to one form, the first and second fuel cell units 170-1 and 170-2 may be disposed in the third space S3, which is located outside the second body frame 124, rather than being disposed in the space between the first and second body frames 122 and 124, thereby being capable of being mounted to the system-mounting frame 410 so as to be mounted and demounted in at least one of the upward direction, the downward direction, or the second direction. Thus, when performing maintenance/repair on the first and second fuel cell units 170-1 and 170-2, it is possible to demount and re-mount the first and second fuel cell units 170-1 and 170-2 from and to the vehicle 100 without dismantling other parts of the vehicle 100. In particular, it is possible to demount and re-mount the first and second fuel cell units 170-1 and 170-2 from and to the vehicle 100 without the necessity to dismantle the hydrogen storage part 150 or the loading part 160 from the vehicle 100, thereby leading to improved efficiency of maintenance/repair of the first and second fuel cell units 170-1 and 170-2, particularly reducing the time and expense required for maintenance/repair of the first and second fuel cell units 170-1 and 170-2.

Figure 9:
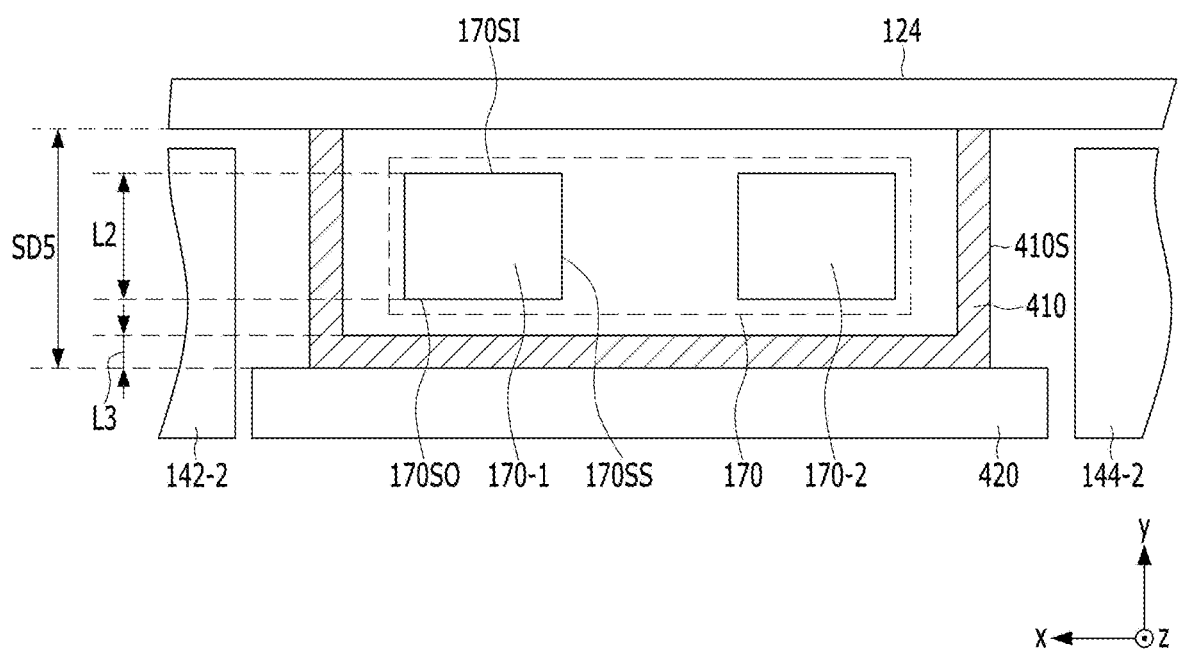
FIG. 9 is a plan view of some parts of a fuel cell vehicle according to one form of the present disclosure.

FIG. 9 is a plan view of some parts of the vehicle 100.

Each of the first and second fuel cell units 170-1 and 170-2 may include an inner surface 170SI and an outer surface 170SO. The inner surface 170SI may be a surface that faces the second body frame 124 in the second direction, and the outer surface 170SO may be a surface that is opposite the inner surface 170SI.

In one form, the vehicle 100 may further include a side protector 420, as illustrated in FIG. 9. The side protector 420 may be disposed to face the outer surface 170SO of each of the first and second fuel cell units 170-1 and 170-2. The side protector 420 may protect the first and second fuel cell units 170-1 and 170-2 from external impacts. For example, the side protector 420 may be mounted to the system-mounting frame 410.

Further, as described above, the side protector 420 may be disposed in the third space S3.

According to one form, as shown in FIG. 9, the side protector 420 may be disposed to face the outer surfaces 170SO of the first and second fuel cell units 170-1 and 170-2, but not to face the side surfaces 170SS of the first and second fuel cell units 170-1 and 170-2. The reason for this is that the vehicle 100 may be protected by the side protector 420 from external impacts applied thereto in the second direction, and the first and second fuel cell units 170-1 and 170-2 may be protected by the front mudguard 142-2 and the rear mudguard 144-2 from external impacts applied thereto in the first direction.

According to another form, unlike the illustration in FIG. 9, the side protector 420 may be disposed to face not only the outer surfaces 170SO of the first and second fuel cell units 170-1 and 170-2 but also the side surfaces 170SS of the first and second fuel cell units 170-1 and 170-2. In this case, the first and second fuel cell units 170-1 and 170-2 may be protected by the side protector 420 from external impacts applied thereto in the first direction. In this case, according to another form, unlike the illustration in FIG. 9, the side protector 420 may be coupled to the side surface 410S of the system-mounting frame 410.

Further, the side protector 420 may be disposed between the front mudguard 142-2 and the rear mudguard 144-2 in the first direction.

Further, each of the first and second fuel cell units 170-1 and 170-2 may have a second length L2 in the second direction, the system-mounting frame 410 may have a third length L3 in the second direction, and the side protector 420 may be spaced apart from the second body frame 124 by a fifth distance SD5 in the second direction. In this case, in order to dispose the first and second fuel cell units 170-1 and 170-2 outside the second body frame 124, the fifth distance SD5 may be greater than the sum of the second length L2 and the third length L3.

Figure 10:
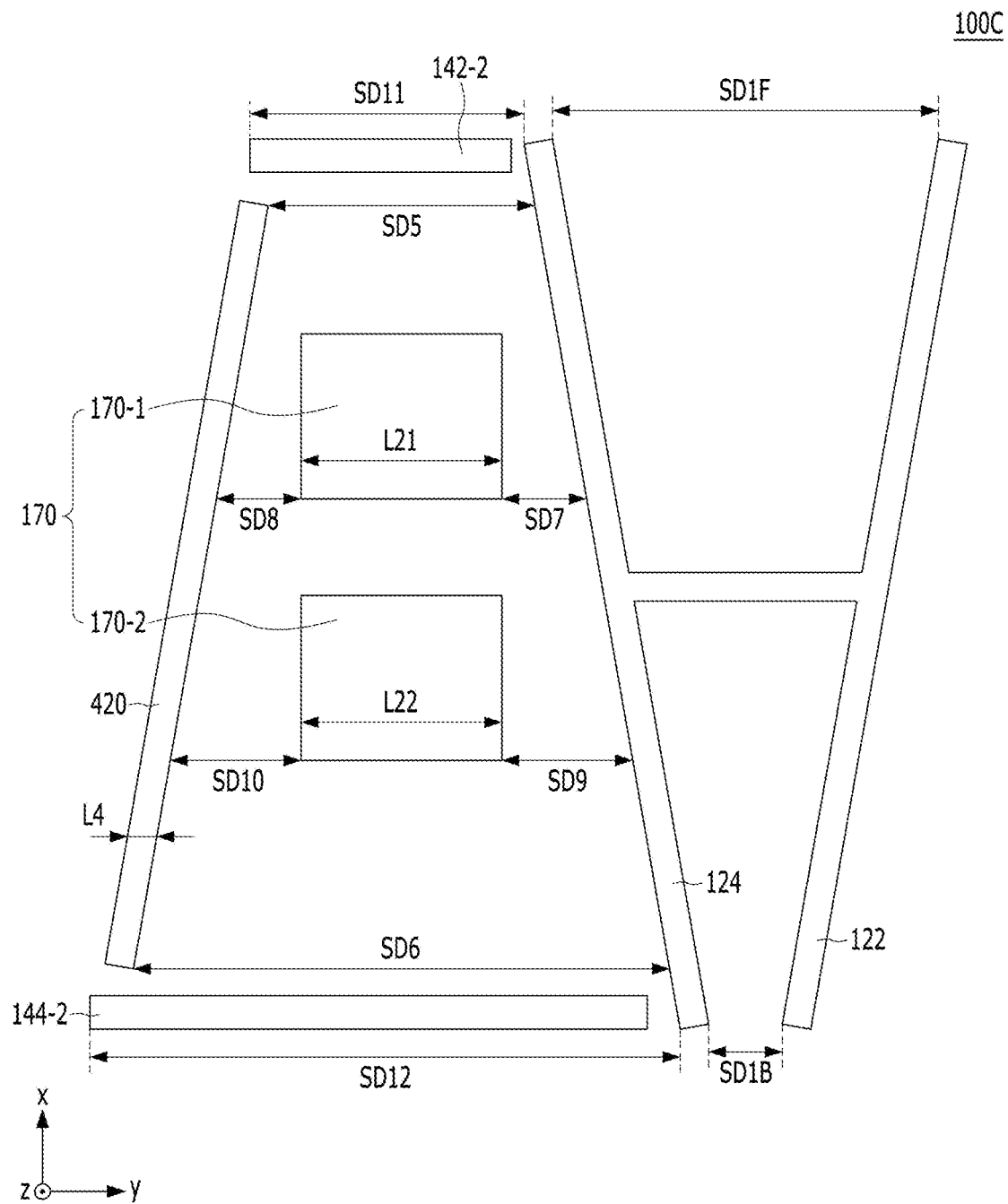
FIG. 10 is a plan view of a fuel cell vehicle according to another form of the present disclosure.

FIG. 10 is a plan view of a vehicle 100C according to still another form.

In the above description, the distance between the first and second body frames 122 and 124, which are spaced apart from each other in the second direction, has been indicated by "SD1" and has been described as being constant. However, according to still another form, the first distance SD1, by which the first and second body frames 122 and 124 are spaced apart from each other in the second direction, may not be constant between the front side and the rear side of the vehicle 100C.

Further, the second lengths L2 of the first and second fuel cell units 170-1 and 170-2 in the second direction are illustrated in FIG. 9 as being the same as each other. However, the 2-1$^{st}$ length L21 of the first fuel cell unit 170-1 in the second direction may be different from the 2-2$^{nd}$ length L22 of the second fuel cell unit 170-2 in the second direction.

Hereinafter, the first distance SD1, by which the first and second body frames 122 and 124 are spaced apart from each other in the second direction at the front end of the vehicle 100C, will be referred to as a "first front distance SD1F", and the first distance SD1, by which the first and second body frames 122 and 124 are spaced apart from each other in the second direction at the rear end of the vehicle 100C, will be referred to as a "first rear distance SD1B".

Further, for convenience of description, it is assumed that the front end of the side protector 420 and the second body frame 124 are spaced apart from each other by a fifth distance SD5 in the second direction at the front side of the vehicle 100C, the rear end of the side protector 420 and the second body frame 124 are spaced apart from each other by a sixth distance SD6 in the second direction at the rear side of the vehicle 100C, the inner surface of the first fuel cell unit 170-1, which faces the second body frame 124, and the second body frame 124 are spaced apart from each other by a seventh distance SD7 in the second direction, the outer surface of the first fuel cell unit 170-1, which faces the side protector 420, and the side protector 420 are spaced apart from each other by an eighth distance SD8 in the second direction, the inner surface of the second fuel cell unit 170-2, which faces the second body frame 124, and the second body frame 124 are spaced apart from each other by a ninth distance SD9 in the second direction, and the outer surface of the second fuel cell unit 170-2, which faces the side protector 420, and the side protector 420 are spaced apart from each other by a tenth distance SD10 in the second direction.

In addition, it is assumed that the outermost portion of the front mudguard 142-2 is spaced apart from the second body frame 124 by an eleventh distance SD11 in the second direction and the outermost portion of the rear mudguard 144-2 is spaced apart from the second body frame 124 by a twelfth distance SD12 in the second direction.

In addition, it is assumed that the side protector 420 has a fourth length L4 in the second direction.

According to one form, as shown in FIG. 10, the first distance SD1, by which the first and second body frames 122 and 124 are spaced apart from each other in the second direction, may gradually decrease from the front side to the rear side of the vehicle 100C. That is, the first front distance SD1F may be greater than the first rear distance SD1B.

In this case, the distance by which the side protector 420 is spaced apart from the second body frame 124 in the second direction may gradually increase from the front side to the rear side of the vehicle 100C. That is, when the 2-1$^{st}$ length L21 and the 2-2$^{nd}$ length L22 are equal to each other and the first front distance SD1F is greater than the first rear distance SD1B, the fifth distance SD5 may be less than the sixth distance SD6, the seventh distance SD7 may be less than the ninth distance SD9, the eighth distance SD8 may be less than the tenth distance SD10, and the eleventh distance SD11 may be less than the twelfth distance SD12.

According to another form, unlike the illustration in FIG. 10, the first distance SD1, by which the first and second body frames 122 and 124 are spaced apart from each other in the second direction, may gradually increase from the front side to the rear side of the vehicle 100C. That is, the first rear distance SD1B may be greater than the first front distance SD1F.

In this case, the distance by which the side protector 420 is spaced apart from the second body frame 124 in the second direction may gradually decrease from the front side to the rear side of the vehicle 100C. That is, when the 2-1$^{st}$ length L21 and the 2-2$^{nd}$ length L22 are equal to each other and the first front distance SD1F is less than the first rear distance SD1B, the fifth distance SD5 may be greater than the sixth distance SD6, the seventh distance SD7 may be greater than the ninth distance SD9, the eighth distance SD8 may be greater than the tenth distance SD10, and the eleventh distance SD11 may be greater than the twelfth distance SD12.

Further, the eleventh distance SD11 may be the sum of the fourth length L4 and the fifth distance SD5, or may be the sum of the fourth length L4, the eighth distance SD8, the 2-1$^{st}$ length L21, and the seventh distance SD7. Further, the twelfth distance SD12 may be the sum of the fourth length L4 and the sixth distance SD6, or may be the sum of the fourth length L4, the tenth distance SD10, the 2-2$^{nd}$ length L22, and the ninth distance SD9.

The spaces between the seventh distance SD7 and the ninth distance SD9 which may be spaced apart from each other spaces through which wires and hoses used for the radiator 180 pass.

According to one form, at least one of the seventh distance SD7 or the 2-1$^{st}$ length L21 may be minimized so that at least one of the fourth length L4 or the eighth distance SD8 may be maximized, thereby securely protecting the first fuel cell unit 170-1 from external impacts.

In addition, at least one of the ninth distance SD9 or the 2-2$^{nd}$ length L22 may be minimized so that at least one of the fourth length L4 or the tenth distance SD10 may be maximized, thereby securely protecting the second fuel cell unit 170-2 from external impacts.

In addition, in the fuel cell vehicle 100C in one form, the 2-1$^{st}$ length L21 and the 2-2$^{nd}$ length L22 may be adjusted so as to prevent the first and second fuel cell units 170-1 and 170-2 from affecting the arrangement of parts (e.g. pipes or wires) around the same.

The first and second fuel cell units 170-1 and 170-2 may be coupled to the system-mounting frame 410 in various manners such that the first and second fuel cell units 170-1 and 170-2 are mounted on (loaded on, coupled to, connected to, or assembled to) the upper side of the system-mounting frame 410 and are separated (removed, disassembled, or demounted) from the upper side of the system-mounting frame 410.

Hereinafter, the coupling relationship between the first and second fuel cell units 170-1 and 170-2 and the system-mounting frame 410 described above will be described with reference to the accompanying drawings. However, the fuel cell vehicle 100 of the present disclosure is not limited to any specific coupling relationship between the first and second fuel cell units 170-1 and 170-2 and the system-mounting frame 410.

Figure 11:
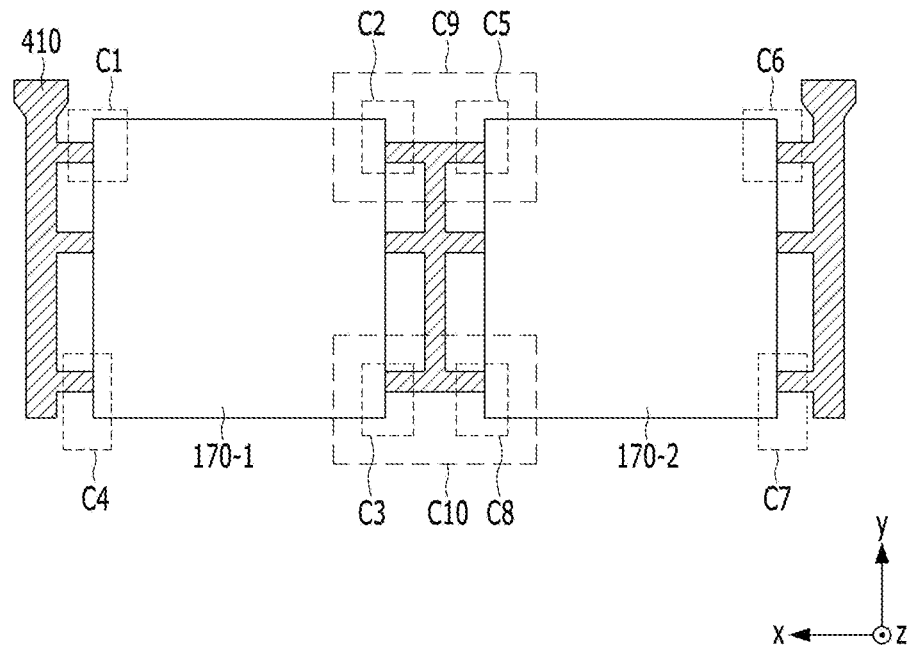
FIG. 11 is a plan view of a fuel cell vehicle according to one form of the present disclosure.
Figure 12:
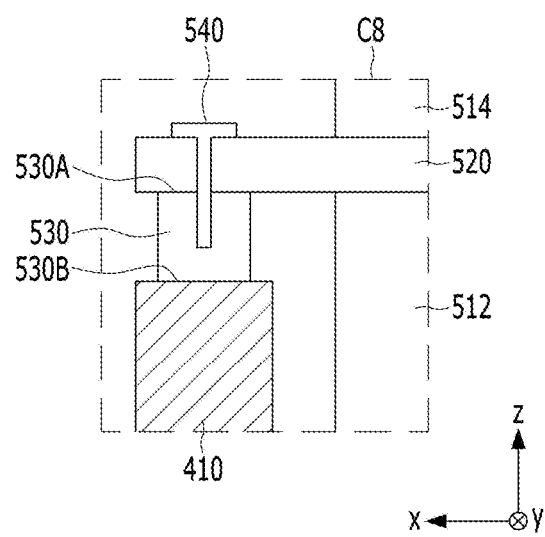
FIG. 12 is a side view of the eighth corner portion shown in FIG. 11.

FIG. 11 is a plan view of the vehicle 100 in one form of the present disclosure, and FIG. 12 is a side view of one form of the eighth corner portion C8 shown in FIG. 11.

Prior to describing the coupling relationship between the first and second fuel cell units 170-1 and 170-2 and the system-mounting frame 410, an exemplary configuration of each of the first and second fuel cell units 170-1 and 170-2 will be described below.

Referring to FIG. 12, the second fuel cell unit 170-2 may include a fuel cell frame 520. The fuel cell frame 520 serves to support the components of the second fuel cell unit 170-2. For example, some 512 of the components 172 to 178 of the fuel cell unit 170A shown in FIG. 4 may be disposed under the fuel cell frame 520, and may be coupled to and supported by the fuel cell frame 520, and the remaining ones 514 of the components 172 to 178 of the fuel cell unit 170A may be disposed on the fuel cell frame 520, and may be coupled to and supported by the fuel cell frame 520.

Since the first fuel cell unit 170-1 has the same configuration as the second fuel cell unit 170-2 shown in FIG. 12, a side view of the first fuel cell unit 170-1 is omitted.

The fuel cell frame 520 of the first fuel cell unit 170-1 may include first to fourth corner portions C1 to C4, and the fuel cell frame 520 of the second fuel cell unit 170-2 may include fifth to eighth corner portions C5 to C8.

According to another form, as shown in FIG. 12, the vehicle 100 may further include a first mount insulator (or a bush) 530 and a first engagement part 540.

The first mount insulator 530 may be disposed between the fuel cell frame 520 and the system-mounting frame 410.

The first engagement part 540 serves to engage one side 530A of the first mount insulator 530 and the fuel cell frame 520 with each other. For example, one side 530A of the first mount insulator 530 and the fuel cell frame 520 may be screwed to each other, and the first engagement part 540 may be implemented as a bolt.

For example, the opposite side 530B of the first mount insulator 530 may be engaged with the system-mounting frame 410 in a press fit manner.

The first mount insulator 530 and the first engagement part 540 may be disposed at at least one of the first to seventh corner portions C1 to C7 in the same structure as that of the first mount insulator 530 and the first engagement part 540 disposed at the eighth corner portion C8 shown in FIG. 12.

Figure 13:
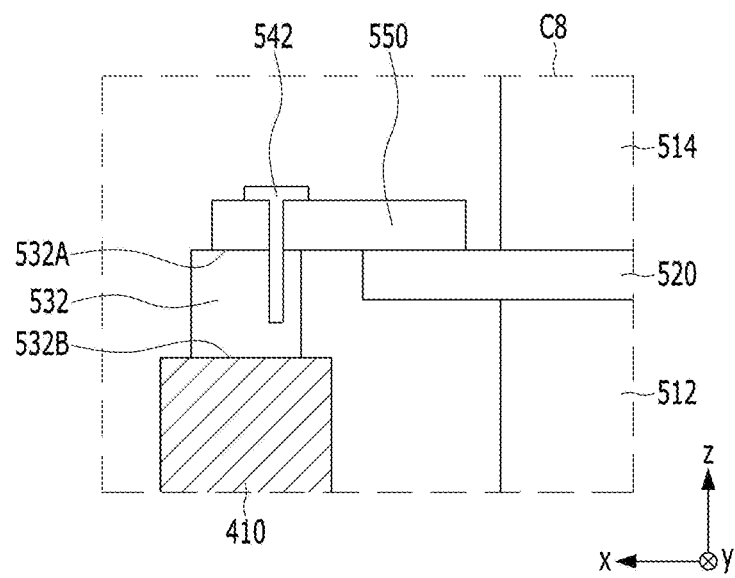
FIG. 13 is a side view of another form of the eighth corner portion shown in FIG. 11.

FIG. 13 is a side view of another form of the eighth corner portion C8 shown in FIG. 11.

According to another form, the vehicle 100C may include an individual mounting bracket 550, a second mount insulator 532, and a second engagement part 542.

The individual mounting bracket 550 has one side secured to the fuel cell frame 520.

The second mount insulator 532 may be disposed between the individual mounting bracket 550 and the system-mounting frame 410.

The second engagement part 542 serves to engage the opposite side of the individual mounting bracket 550 and one side 532A of the second mount insulator 532 with each other. For example, in order to allow the opposite side of the individual mounting bracket 550 and one side 532A of the second mount insulator 532 to be screwed to each other, the second engagement part 542 may be implemented as a bolt.

The opposite side 532B of the second mount insulator 532 may be engaged with the system-mounting frame 410 in a press fit manner.

The individual mounting bracket 550, the second mount insulator 532, and the second engagement part 542 may be disposed at at least one of the first to seventh corner portions C1 to C7 in the same structure as that of the individual mounting bracket 550, the second mounting insulator 532, and the second engagement part 542 disposed at the eighth corner portion C8 shown in FIG. 13.

Figure 14:
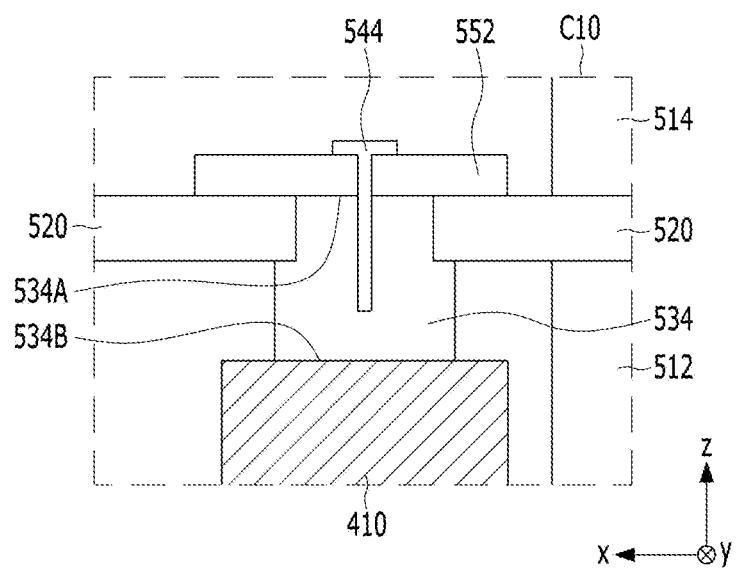
FIG. 14 is a side view of the tenth corner portion shown in FIG. 11.

FIG. 14 is a side view of one form of the tenth corner portion C10 shown in FIG. 11.

According to still another form, the vehicle 100 may include a common mounting bracket 552, a third mount insulator 534, and a third engagement part 544.

The common mounting bracket 552 may be secured in common to a plurality of fuel cell frames 520 of the first and second fuel cell units 170-1 and 170-2, which are adjacent to each other.

The third mount insulator 534 may be disposed between the common mounting bracket 552 and the system-mounting frame 410.

The third engagement part 544 serves to engage the common mounting bracket 552 and one side 532A of the third mount insulator 534 with each other. For example, in order to allow the common mounting bracket 552 and one side 532A of the third mount insulator 534 to be screwed to each other, the third engagement part 544 may be implemented as a bolt.

The opposite side 534B of the third mount insulator 534 may be engaged with the system-mounting frame 410 in a press fit manner.

The common mounting bracket 552, the third mount insulator 534, and the third engagement part 544 may be disposed at the ninth corner portion C9 in the same structure as that of the common mounting bracket 552, the third mount insulator 534, and the third engagement part 544 disposed at the tenth corner portion C10 shown in FIG. 14.

The first, fourth, sixth and seventh corner portions C1, C4, C6 and C7 shown in FIG. 11 may be implemented as shown in FIG. 12 or 13, and at least one of the ninth or tenth corner portion C9 or C10 may be implemented as shown in FIG. 14.

Each of the first mount insulator 530, the second mount insulator 532, and the third mount insulator 534 described above has vibration insulating (or isolation) properties.

Accordingly, the first mount insulator 530 may prevent or minimize the transfer of vibration from the fuel cell frame 520 to the system-mounting frame 410, and may prevent or minimize the transfer of vibration from the system-mounting frame 410 to the fuel cell frame 520. In addition, the second mount insulator 532 may prevent or minimize the transfer of vibration from the individual mounting bracket 550 to the system-mounting frame 410, and may prevent or minimize the transfer of vibration from the system-mounting frame 410 to the individual mounting bracket 550. In addition, the third mount insulator 534 may prevent or minimize the transfer of vibration from the fuel cell frame 520 and the common mount bracket 552 to the system-mounting frame 410, and may prevent or minimize the transfer of vibration from the system-mounting frame 410 to the fuel cell frame 520 and the common mounting bracket 552.

When the common mounting bracket 552 is used, as shown in FIG. 14, the length of the space occupied by the first and second fuel cell units 170-1 and 170-2 and the system-mounting frame 410 in the first direction may be reduced compared to when the individual mounting bracket 550 is used, as shown in FIG. 13. Accordingly, it is possible to prevent or minimize the occurrence of problems attributable to insufficient space for mounting components when designing the vehicle 100.

In addition, compared to when the individual mounting bracket 550 of FIG. 13 or the common mounting bracket 552 of FIG. 14 is used, when the fuel cell frame 520 and the first mount insulator 530 are directly engaged with each other without using the components 550 and 552, as shown in FIG. 12, the amount of space occupied by the components 550 and 552 may be reduced. Accordingly, it is possible to further prevent or minimize the occurrence of problems attributable to insufficient space for mounting components when designing the vehicle 100.

As is apparent from the above description, through the efficient arrangement of the plurality of fuel cell units, the fuel cell vehicles 100 (100A, 100B and 100C) according to the above-described forms may exhibit various advantages, such as an increase in the amount of cargo or the number of passengers that can be carried, balanced weight distribution, stabilization of the vehicle, and improved efficiency of maintenance/repair.

The above-described various forms may be combined with each other without departing from the objects of the present disclosure unless they are contrary to each other. In addition, for any element that is not described in detail in any of the various forms, reference may be made to the description of an element having the same reference numeral in another form.

While the present disclosure has been particularly shown and described with reference to exemplary forms thereof, these forms are only proposed for illustrative purposes and do not restrict the present disclosure, and it will be apparent to those skilled in the art that various changes in form and detail may be made without departing from the essential characteristics of the forms set forth herein. For example, respective configurations set forth in the forms may be modified and applied. Further, differences in such modifications and applications should be construed as falling within the scope of the present disclosure.

What is claimed is:

1. A fuel cell vehicle, comprising:
a battery disposed in a first space of the fuel cell vehicle;
a radiator disposed in a second space arranged adjacent to the first space in a second direction intersecting a first direction, the first direction being a direction in which the fuel cell vehicle travels; and
at least one fuel cell unit disposed in a third space arranged adjacent to the first space in the second direction while being spaced apart from the second space in the second direction, with the first space interposed therebetween,
wherein a first weight difference between a first weight of the radiator and a second weight of the at least one fuel cell unit is less than a second weight difference between a third weight of the battery and the first weight of the radiator, and the first weight difference is less than a third weight difference between the third weight of the battery and the second weight of the at least one fuel cell unit.

2. The fuel cell vehicle according to claim 1, wherein the at least one fuel cell unit comprises a plurality of fuel cell units, and
wherein each fuel cell unit of the plurality of fuel cell units comprises:
a fuel cell;
a fluid supply unit configured to supply a fluid to the fuel cell;
an electronic unit configured to be electrically connected to the fuel cell; and
a controller configured to control the electronic unit and the fluid supply unit.

3. The fuel cell vehicle according to claim 1, further comprising:
first and second body frames extending in the first direction and disposed opposite to each other while being spaced apart from each other in the second direction,
wherein, when viewed in plan, the first space overlaps a space between the first and second body frames, the second space is located outside the first body frame, and the third space is located outside the second body frame.

4. The fuel cell vehicle according to claim 3, wherein the third space is located between a top surface of the second body frame and a bottom surface of the fuel cell vehicle.

5. The fuel cell vehicle according to claim 4, wherein a top surface of the at least one fuel cell unit is lower than a top surface of the second body frame.

6. The fuel cell vehicle according to claim 4, further comprising:
a cab; and
a loading part located behind the cab,
wherein a bottom surface of the loading part is higher than a top surface of each of the first and second body frames.

7. The fuel cell vehicle according to claim 6, further comprising:
a hydrogen storage part located between the cab and the loading part in the first direction,
wherein a bottom surface of the hydrogen storage part is higher than a top surface of each of the first and second body frames.

8. The fuel cell vehicle according to claim 3, further comprising:
a front mudguard disposed at a front side of the fuel cell vehicle; and
a rear mudguard disposed at a rear side of the fuel cell vehicle,
wherein the at least one fuel cell unit is disposed in the third space located outside the second body frame between the front mudguard and the rear mudguard.

9. The fuel cell vehicle according to claim 3, further comprising:
a system-mounting frame mounted to the second body frame, the system-mounting frame being configured to allow the at least one fuel cell unit to be loaded thereon.

10. The fuel cell vehicle according to claim 9, wherein the system-mounting frame is disposed in the third space.

11. The fuel cell vehicle according to claim 9, wherein the at least one fuel cell unit is loaded on the system-mounting frame so as to be mounted and demounted in at least one of an upward direction, a downward direction, or the second direction.

12. The fuel cell vehicle according to claim 9, further comprising:
a side protector disposed to face an outer surface of the at least one fuel cell unit, the outer surface of the at least one fuel cell unit being opposite to an inner surface of the at least one fuel cell unit that faces the second body frame.

13. The fuel cell vehicle according to claim 12, wherein the side protector is disposed in the third space.

14. The fuel cell vehicle according to claim 12, wherein the side protector is mounted to the system-mounting frame.

15. The fuel cell vehicle according to claim 12, wherein a distance by which the first and second body frames are spaced apart from each other in the second direction gradually decreases from a front side to a rear side of the fuel cell vehicle, and
wherein a distance by which the side protector is spaced apart from the second body frame in the second direction gradually increases from the front side to the rear side of the fuel cell vehicle.

16. The fuel cell vehicle according to claim 12, wherein a distance by which the first and second body frames are spaced apart from each other in the second direction gradually increases from a front side to a rear side of the fuel cell vehicle, and wherein a distance by which the side protector is spaced apart from the second body frame in the second direction gradually decreases from the front side to the rear side of the fuel cell vehicle.

17. The fuel cell vehicle according to claim 1, wherein the battery is spaced apart from a front axle by a first distance in the first direction, wherein the radiator is spaced apart from the front axle by a second distance in the first direction, wherein the at least one fuel cell unit is spaced apart from the front axle by a third distance in the first direction, and wherein the first distance is greater than each of the second and third distances.

\* \* \* \* \*